United States Patent [19]
Israel et al.

[11] 3,909,828
[45] Sept. 30, 1975

[54] AIRBORNE REPEATER DECOY

[75] Inventors: William D. Israel, Ellicott City;
William B. McCartney, Odenton;
Edward Otto Uhrig, Catonsville, all of Md.

[73] Assignee: The United States of America as represented by the Secretary of the Navy, Washington, D.C.

[22] Filed: Nov. 23, 1965

[21] Appl. No.: 510,142

[52] U.S. Cl. ............... 343/18 E; 330/43; 343/6.8 R
[51] Int. Cl.² .... G01S 9/56; H03F 3/58; H04K 3/00
[58] Field of Search .................. 343/6.5, 6.8, 18 E; 330/43

[56] References Cited
UNITED STATES PATENTS

| | | | |
|---|---|---|---|
| 2,676,246 | 4/1954 | Rinia | 330/43 X |
| 3,113,268 | 12/1963 | Horak | 343/6.8 X |
| 3,165,696 | 1/1965 | Poole | 330/43 X |

*Primary Examiner*—Malcolm F. Hubler
*Attorney, Agent, or Firm*—G. J. Rubens; Henry Hansen

[57] ABSTRACT

An electronic repeater system for a decoy missile having a low standby power but a high peak power output traveling wave tube which is pulsed from a pulse forming network during the presence of a received radar signal. A portion of the received signal is fed back to the traveling wave tube and amplified therein during the conduction period as determined by the pulse forming network.

9 Claims, 1 Drawing Figure

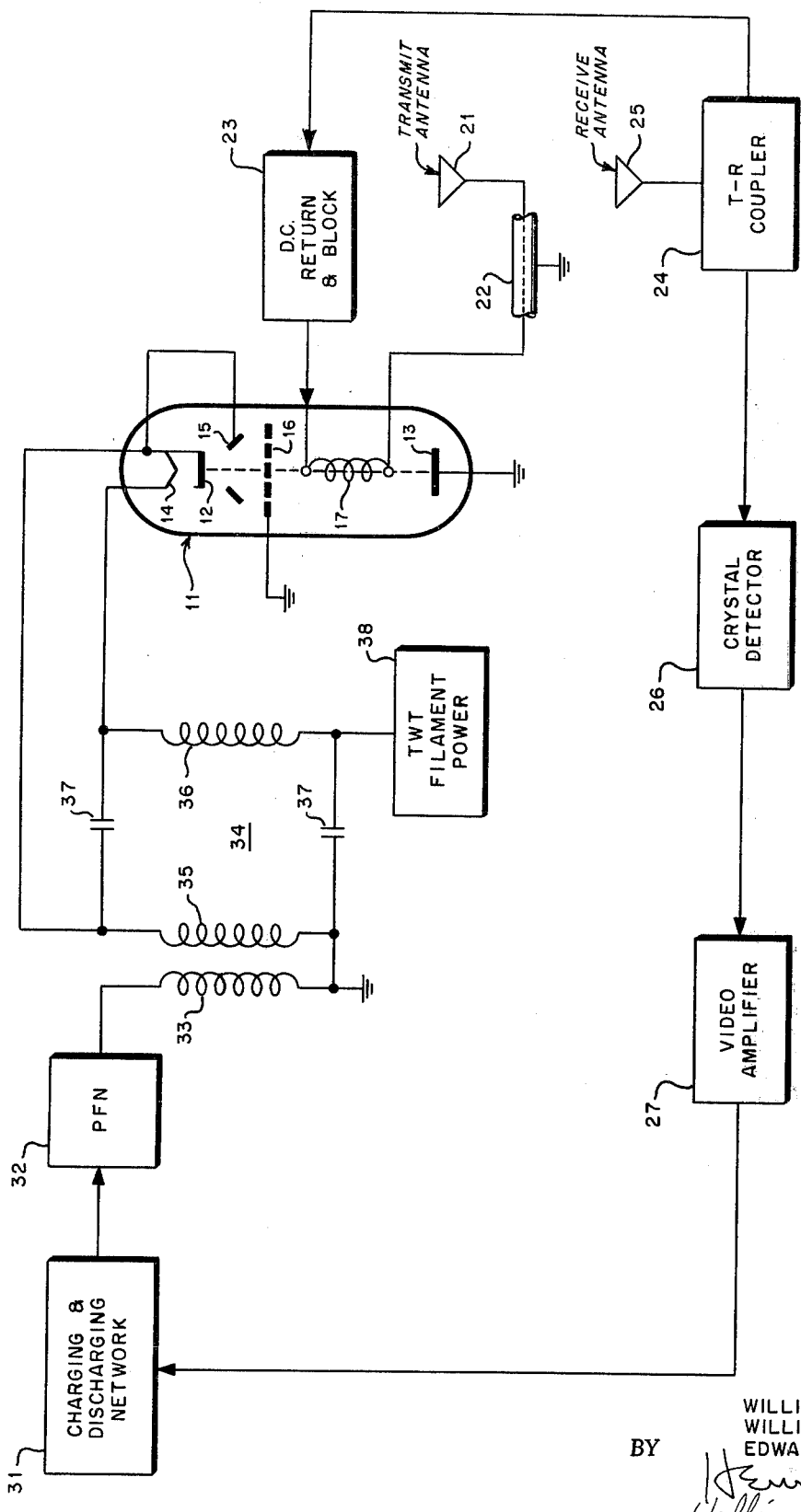

AIRBORNE REPEATER DECOY

The present invention relates to a repeater or track-breaking decoy and more particularly to a decoy missile which intercepts and imitates pulses from hostile radars so as to cause the radar to track the decoy missile instead of the approaching aircraft.

When aircraft are approaching a hostile territory they are usually met with airborne intercept radar designed to locate the aircraft for the purpose of destroying it by means of missiles or other anti-aircraft devices. It has been the general practice for the approaching aircraft to use various means of fooling the airborne intercept radar to deceive it as to the location of the aircraft. Passive means such as metal chaff have been used. Active airborne electronic countermeasure devices have also been developed in the form of a missile fired by the aircraft which contains an electronic transceiver means for receiving the pulses of the airborne intercept radar and firing them back highly amplified to give the impression that the decoy missile fired off from the aircraft is the aircraft. It is presumed the decoy will be successful if the signal returned by it to the radar is stronger than the radar reflection from the skin of the aircraft. Such devices have been difficult and unwieldy up to the present due to the difficulty of presenting a radar pulse repeater of the level of several kilowatts power in a package the size of a small decoy missile. For example, one known decoy repeater utilizes a succession of four traveling wave tubes in line with an attendant very high standing power requirement. An electronic repeater system is needed that has high peak power output but with low standing powder requirements and small size.

The general purpose of this invention is to provide a decoy missile with an electronic repeater system which has very low standing power requirements but a high peak output and which fits into an extremely compact decoy missile case. To attain this the present invention uses a single traveling wave tube which is pulsed from a pulse forming network charged by a charging network in which the necessary high voltage on the traveling wave tube is present only during the transmitted pulse. The invention also presents a novel design of traveling wave tube a focus electrode directly linked to the cathode and with a grounded grid and collector with efficient transmitted pulse forming. The invention also contemplates a double secondary pulse transformer in which the filament of the traveling wave tube is connected across the two coils in the output of the pulse transformer so that the filament voltage does not change when the tube is being fired.

Accordingly, it is an object of the present invention to provide a radar repeater decoy missile having a compact body with high peak output power and low standing power requirements.

Another object of the invention is to provide a radar pulse repeater system using a traveling wave tube having high voltage on it only at the time of pulse transmission.

A further object of the invention is the provision of a traveling wave tube in a repeater decoy system having a filament whose voltage remains constant during pulse transmission.

Other objects and many of the attendant advantages of this invention will be readily appreciated as the same becomes better understood by reference to the following detailed description when considered in connection with the accompanying drawing wherein:

The FIGURE shows a block schematic circuit diagram of the electronic repeater system of the decoy missile according to the present invention.

In the FIGURE there is shown a traveling wave tube 11 having a cathode 12 and collector 13. The cathode 12 is heated by a filament 14 having one end directly connected to cathode 12 and positioned directly behind cathode 12. Directly ahead of cathode 12 and also electrically linked to it is a focusing electrode ring 15. This has the purpose of centering the electrons emitted by cathode 12 into a thin, sharp beam passing along the dotted line as shown to collector 13. Directly ahead of the electrode 15 is a grid screen 16 which as shown is connected to ground. Extended for a distance between the grid 16 and collector 13 is a helix 17 which is positioned so as to be wound around the path of electrons from cathode 12 to collector 13.

As shown, one end of helix 17 is connected to a transmitter antenna 21 through a coaxial line 22. The other end of the helix 17 is connected to a d. c. return and block device 23 which serves the function of returning to ground the electrons from the electron beam which collect on helix 17. This is necessary to protect crystal mounting from damage caused by surge current. The direct current portion of the signal generated in helix 17 is prevented from passing further by components of d. c. return and block device 23 which may be, for example, an inductor for providing the d.c. return path and a capacitor to provide d.c. blocking for the helix voltage. A signal is coupled to helix 17 through d.c. return and block device 23 from a transmit receive coupler 24 connected to a receive antenna 25. The function of the transmit receive coupler 24, as is well known in the art, is to divide the input power and conduct some into the d. c. return and block device 23 and some into a crystal detector 26. When the traveling wave tube 11 is not transmitting, receive antenna 25 is permitted by TR coupler 24 to receive radar pulses which are sent to the crystal detector 26 which detects the signal portion of the radar pulse and passes it on to a video amplifier 27. The function of video amplifier 27 is to detect an incoming radar pulse and generate an output envelope pulse in response thereto. Video amplifier 27 is set to saturate at the lowest expected input signal. Such devices are well known in the art and need not be shown here.

The envelope output from video amplifier 27 indicating the reception of a radar pulse is sent to a charging and discharging network 31. The details of this network 31 are the subject of a separate patent application, Ser. No. 438,436, filed Mar. 9, 1965, for High Rise Thyratron Pulse Supply, now U.S. Pat. No. 3,387,177, which application is incorporated by reference herein. As disclosed therein the function of network 31 is to discharge a thyratron contained therein at the receipt of a pulse and thereafter to charge up the circuit again in preparation for the next pulse. The charge from charging network 31 is stored on a pulse forming network 32 which is discharged through a thyratron contained in network 31 when a signal is received from video amplifier 27. The other side of pulse forming network 32 is linked to the input coil 33 of a pulse transformer 34. Besides the input coil 33 there are contained in pulse transformer 34 an output coil 35 and a secondary coil 36 bifilarly wound therewith which are linked together at both ends by capacitances 37. Linked to one end of secondary coil 36 is a traveling wave tube filament power supply 38. This is generally about 7 volts, just sufficient to keep filament 14 and the cathode 12 warmed up.

The circuit shown in the FIGURE is mounted in the missile in a barrel-like configuration, at the ends of which are the transmit and receive antennas which are wave guide antennas of known design and therefore not shown. Between the antennas is the traveling wave tube 11 which takes up the major portion of the electronic section of the rocket. The rocket engine, which may be any rocket engine of known design having an outer diameter compatible with the electronic section, may be attached at either end. The engine may be, for example, a Thiokol TE 352. Since the electronic section may be mounted on the rocket engine at either end thereof the decoy missile may be set to deceive radar either in front or in back of the aircraft. The mounting of the electronic section in the rocket is not shown as it does not form a part of the present invention.

The operation of the repeater decoy system is as follows. The missile is launched by the operator when a threat in the form of an anti-aircraft radar is detected. The filament power 38 has been turned on previously so that filament 14 and cathode 12 are warmed up. However, the voltage applied to the cathode 12 at this point is essentially zero. An oscillator contained in network 31 will charge up pulse forming network 32 at periodic intervals if no radar pulses are received immediately. This is to compensate for leakage from the capacitances in pulse forming network 32. When a radar pulse is received in receive antenna 25 crystal detector 26 detects the envelope of the pulse and saturates video amplifier 27 causing a sharp rise in the output. This envelope is injected into the pulse source input of network 31 as shown in the above-identified application Ser. No. 438,436, now U.S. Pat. No. 3,387,177. This causes the thyratron contained therein to short, discharging pulse forming network 32 through the input coil 33 of transformer 34. The output voltage generated on cathode 12 of tube 11 is in the neighborhood of −12 kilovolts. Since coils 35 and 36 are bifilarly wound and connected by capacitances 37 the voltage on each side of filament 14 will be carried up by the same amount, and, therefore, permitting filament 14 to be tied to cathode 12 so as to prevent arcing and to reduce input capacity. Since grid 16 remains essentially at ground the effect is to cause a very sharp conduction of an electron beam in traveling wave tube 11. Coincident with this 12 kilovolt pulse is the amplification of the received radar pulse through helix 17 of the traveling wave tube 11. As is well known in the art, the varying components of the electron beam in traveling wave tube 11 generate a traveling wave which interacts with helix 17 to generate a highly amplified output signal. Electrons trapped in helix 17 are returned to ground through d. c. return and block device 23. Shortly after the pulse is transmitted by the decoy an inverter contained in network 31 recharges pulse forming network 32 and the cycle is ready to begin again at the reception of another radar pulse. The power supply in network 31 is required only to produce voltage pulses for a short period of time during the charging of pulse forming network 32. Then the power supply essentially stands idle until the network is discharged by a transmitted pulse whereupon the power supply is drawn upon again. The traveling wave tube 11 contained herein is capable of accepting better than 10 kilowatts of beam power which is sufficient for a minimum of 1 kilowatt output at the band edges and as much as 2 kilowatts at the center of the band. The collector 13 may be provided if desired with a Vac Ion pump as protection against minor leaks, but this is optional.

Obviously many modifications and variations of the present invention are possible in the light of the above teachings. It is therefore to be understood that within the scope of the appended claims the invention may be practiced otherwise than as specifically described.

What is claimed is:

1. A repeater decoy comprising:
    means to receive a radar pulse;
    a traveling wave tube connected to receive a first portion of said radar pulse;
    means responsive to a second portion of said radar pulse to drive said tube into conduction, said means including a pulse forming network electrically connected with said traveling wave tube and a charging and discharging network for discharging said pulse forming network upon reception of said radar pulse and for charging said pulse forming network a predetermined time thereafter, whereby said tube amplifies said first portion of said radar pulse; and
    a transmitting antenna connected to the output of said traveling wave tube to radiate the amplified radar pulse.

2. A repeater decoy as recited in claim 1, wherein said means to receive comprises:
    a receiving antenna connected with said means responsive to the second portion of the radar pulse; and
    a coupler connected to said receiving antenna for dividing the received radar pulse into said first and second portions.

3. A repeater decoy as recited in claim 2 wherein said means to drive said tube into conduction further comprises:
    a detector to detect said second portion of said radar pulse; and
    a video amplifier connected with said detector for amplifying the detected pulse.

4. A repeater decoy as recited in claim 3 wherein said means to drive said tube into conduction further comprises
    a pulse transformer through which said pulse forming network is discharged into said tube.

5. A repeater decoy as recited in claim 4 wherein said tube has a cathode and a collector and wherein said pulse transformer comprises:
    an input coil connected between said pulse forming network and ground; and
    an output coil connected between the cathode of said traveling wave tube and ground.

6. A repeater decoy as recited in claim 5 further comprising:
    a secondary coil bifilarly wound with said output coil, one end of said secondary coil being capacitively linked to ground, the other end being capacitively linked to the cathode of said tube;
    a heating filament in said tube directly connected at one end to the cathode and at its other end to said other end of said secondary coil.

7. A repeater decoy as recited in claim 6 wherein the collector of said tube is grounded, and further comprising:
- a focus electrode directly connected to the cathode of said tube and positioned in said tube around the path of electrons from the cathode to the collector.

8. A repeater decoy as recited in claim 7, further comprising:
- a helix positioned in said tube between the collector and said electrode around the path of electrons, a portion of said helix being connected to said transmitting antenna, and a portion of said helix being connected to said coupler to accept incoming radar pulses when said tube is transmitting.

9. A repeater decoy as recited in claim 8, further comprising a grounded grid positioned in said tube between said helix and said electrode.

* * * * *